United States Patent [19]

Sims

[11] 4,186,419
[45] Jan. 29, 1980

[54] APPARATUS FOR MONITORING AND CONTROLLING LIQUID LEVEL

[76] Inventor: Bobby H. Sims, 417 Illinois St., Hot Springs, Ark. 71901

[21] Appl. No.: 961,985

[22] Filed: Nov. 20, 1978

[51] Int. Cl.² .................................................. H01H 47/00
[52] U.S. Cl. ...................................... 361/178; 73/313;
200/84 C; 335/206; 417/40
[58] Field of Search ..................... 73/313, 314; 222/51;
200/84 C; 361/178; 417/40; 335/206

[56] References Cited

U.S. PATENT DOCUMENTS

| 3,397,347 | 8/1968 | Hoeppel | 361/178 X |
|---|---|---|---|
| 3,437,771 | 4/1969 | Nusbaum | 200/84 C |
| 3,685,357 | 8/1972 | Alexander | 73/313 |
| 3,787,733 | 1/1974 | Peters | 361/178 X |
| 3,826,139 | 7/1974 | Bachman | 73/313 X |
| 4,064,755 | 12/1977 | Bongort | 73/313 |
| 4,135,137 | 1/1979 | Thomas | 200/84 C X |

Primary Examiner—Daniel M. Yasich
Attorney, Agent, or Firm—Sabin C. Bronson

[57] ABSTRACT

An apparatus for monitoring and controlling the liquid level in a storage tank which involves placing at least two magnetically operated switches, e.g., magnetic-reed switches, at different levels in the tank and causing a magnet-containing float to move in response to the liquid level to activate these switches. A relay operates upon activation of the higher of these switches to start electrical current flowing to operate a discharge pump, thereby controlling the liquid level in the tank. In a preferred embodiment, a third magnetically operated switch is employed so that when the magnet activates the third switch at least one indication, e.g., sound and/or light alarm, is given that the liquid level is at least at a predetermined level.

8 Claims, 4 Drawing Figures

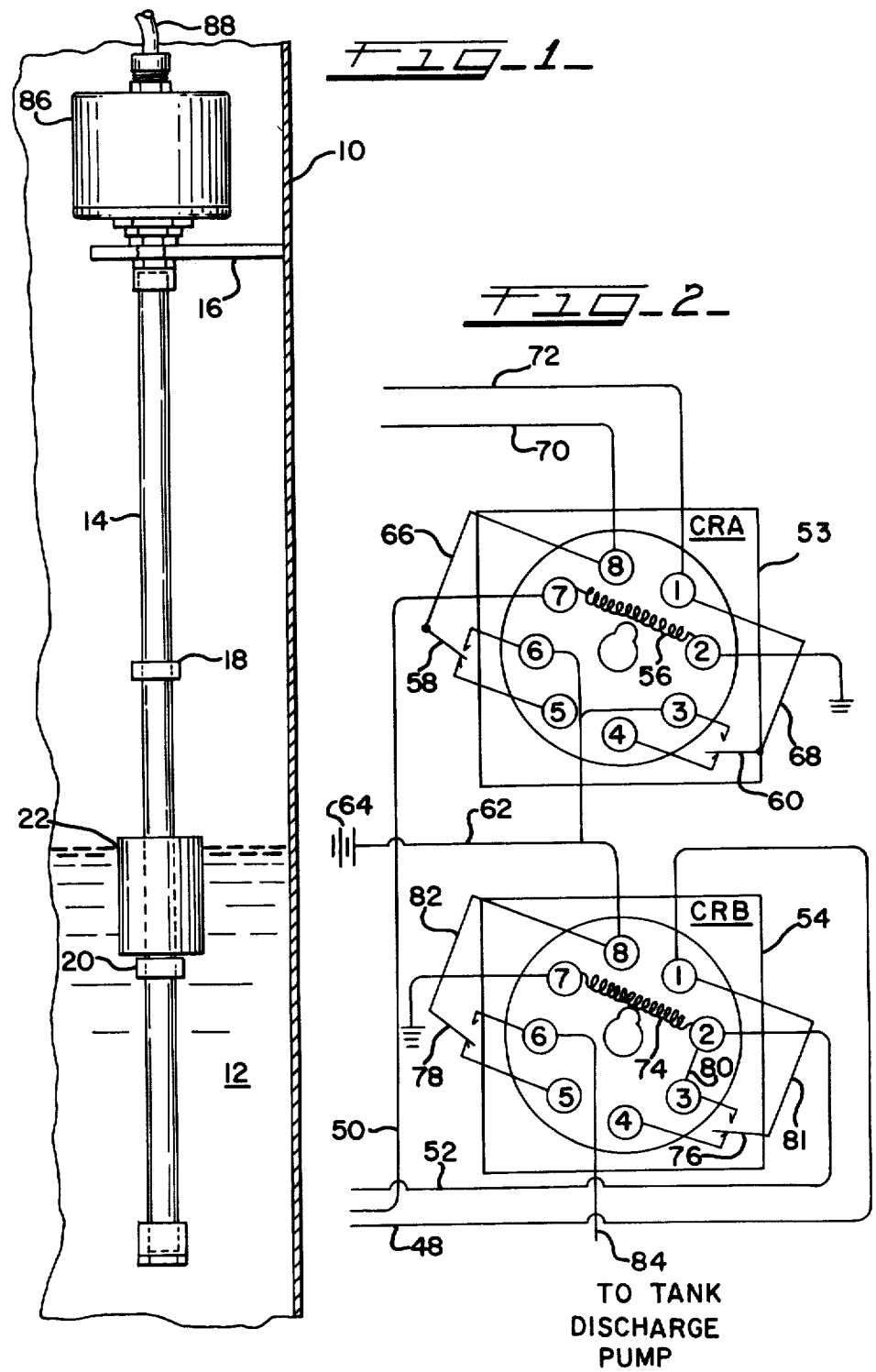

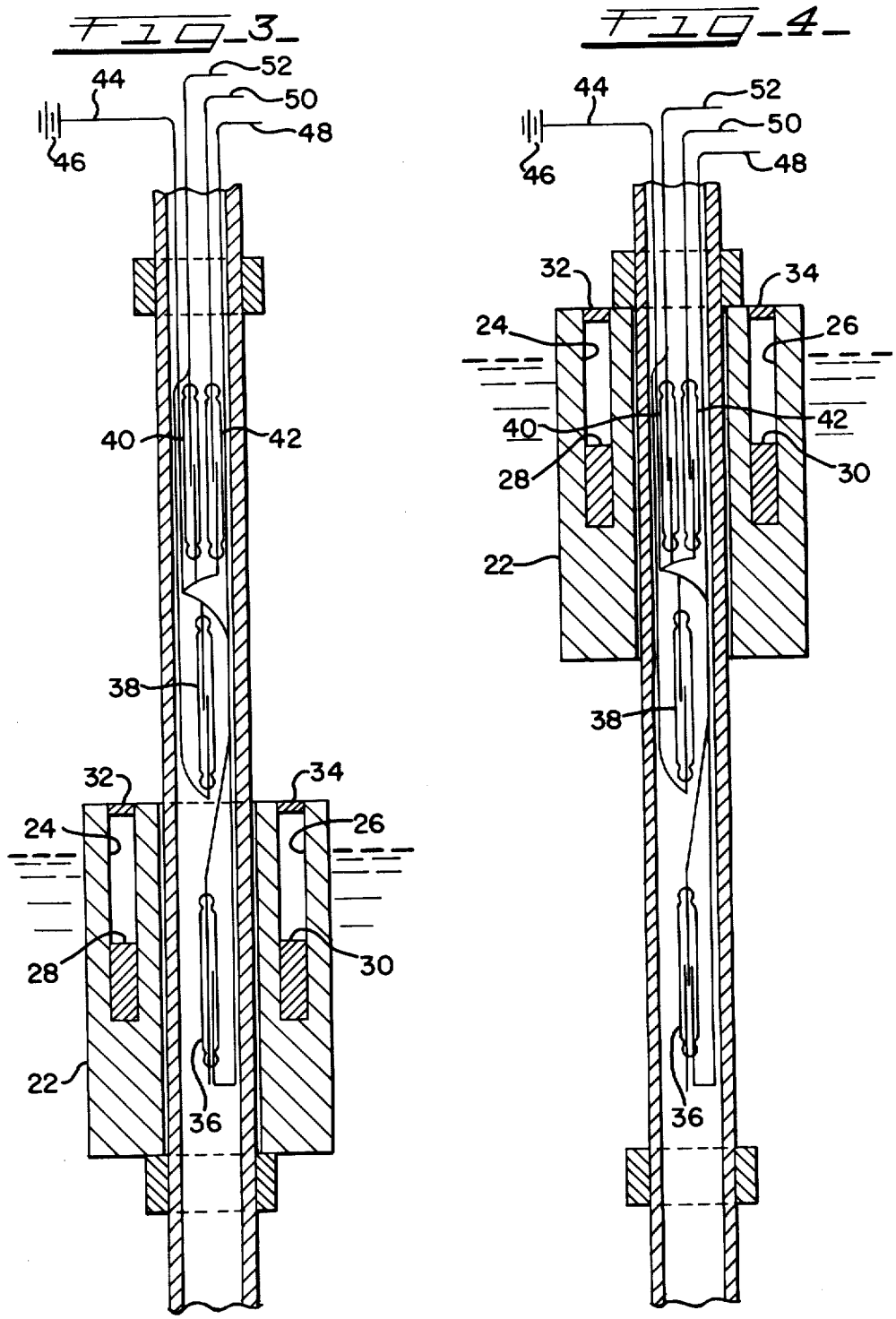

APPARATUS FOR MONITORING AND CONTROLLING LIQUID LEVEL

BACKGROUND AND SUMMARY OF THE INVENTION

This invention relates to an improved apparatus for monitoring and controlling liquid levels. More particularly, the invention relates to such an apparatus which involves magnetically-operated switches as an integral part thereof.

The monitoring and control of liquid levels in various receptacles or containers, i.e., storage tanks, is clearly important in many instances in many industries. The use of magnetically operated switches to monitor liquid levels has been suggested for example, in U.S. Pat. Nos. 3,548,659 and 3,982,087. Such previous devices have merely served to indicate the level of liquid in a container. Controlling the level of liquid in a storage tank may be of vital importance to avoid dangerous, and even deadly, conditions.

Therefore, one object of the present invention is to provide an apparatus for controlling the liquid level in a storage tank.

Another object of the present invention is to provide an apparatus for monitoring the liquid level in a storage tank.

A still further object of the present invention is to provide an apparatus for monitoring and controlling the liquid level in a storage tank, which apparatus involves magnetically operated switches. Other objects and advantages of the present invention will become apparent hereinafter.

An improved apparatus for monitoring and controlling the level of liquid in a storage tank equipped with a pump to discharge liquid, as desired, has now been discovered. The apparatus includes a tubular guide extending substantially vertically inside the storage tank with first and second magnetically operated (or activated) switches located therein. The second switch is located a distance above the first switch. A first electrical current source causes current to pass through the first and/or second switch when the first and/or second switch is in the closed position and forms part of an electrical circuit.

Further, the apparatus includes a float which is slidable on the exterior of the guide in response to the level of liquid, the float carries a magnet having sufficient force to activate the first and second switches as the float slides on the guide to a location in proximity to one or the other of such switches. The term "activate" as used in reference to the presently useful magnetically operated switches means that the switch is caused to move from its normal mode. Thus, a normally closed first switch is activated by the magnet in the float to an open position.

A second electrical current source is included to provide current to activate the discharge pump in response to the position of the first and second switches. Although the pump is preferably electrically driven, it need not be and may be chosen based on the type of liquid being handled and the conditions of handling. For example, current from the second current source may open valving arrangements to allow steam or compressed air to run a pneumatically driven pump. In any event, the pump is electrically activated, directly or indirectly. A first relay, in communication with the first and second switches allows current from the second source to start flowing to activate the pump as the magnet activates the second switch. Once current to the pump starts flowing, such current is interrupted in response to the magnet activating the first switch.

The present apparatus is seen to effectively control the level of liquid in the storage tank, e.g., between the levels corresponding to the locations of the first and second magnetically operated switches.

In a preferred embodiment, the present apparatus further includes an alternate second magnetically operated switch which is located in the tubular guide a distance above the second magnetically operated switch. This alternate switch is also in electrical communication with the first current source so that current passes through this alternate switch when it is in the closed position and part of an electrical circuit. Current from the second current source will start flowing to the pump (if the current is not already flowing) as the magnet in the float activates the alternate switch. Only one of the second switch or the second alternate switch need be activated, e.g., by the magnet in the float, to start current flowing to the pump. Thus, the alternate second magnetically operated switch provides substantial safety benefits to the present apparatus. If for some reason, e.g., an electrical power failure, the second switch is not activated as the magnet in the float passes by this second switch, the magnet has a "second" chance to activate the discharge pump by activating the alternate second switch located at a higher level. In a still further preferred embodiment, the tubular guide includes a top block to prevent the float from rising any higher in the storage tank. The top block is preferably positioned so that as the float contacts the top block, the magnet in the float is in position to activate the alternate second switch. For example, when the electrical power is turned back on, current will immediately start flowing to the pump regardless of how far above the second alternate switch the liquid level is. The use of a top block as described above represents an additional safety feature of the present invention.

As noted above, the present apparatus preferably includes a top block. In addition, a bottom block is preferably secured to the guide so that the combination of top and bottom blocks act to confine the movement of the float on the guide. The bottom block is situated so that when the float contacts the bottom block the magnet in the float is positioned to activate the first magnetically operated switch.

A further embodiment of the apparatus involves a third magnetically operated switch located in the tubular guide a distance above the second magnetically operated switch, and preferably at substantially the same level as the alternate magnetically operated switch. This third switch is capable of being activated by the magnet in the float and is in electrical communication with the first electrical current source to cause current to flow through this switch when it is closed and part of an electrical circuit. A second relay is in electrical communication with the third switch to allow current from the second source, described previously, to provide at least one sensible (i.e., capable of being understood by the senses, such as audial, visual and the like) indication, preferably two such indications, is at least at a predetermined level upon the third switch being activated. In effect, the third switch and second relay act as an alarm system to warn that the liquid in the storage tank has built to a level predetermined to be of concern to the operator. The preferred two sensible indicators, or alarms, e.g., audial and visual, is yet another safety feature of the present invention.

When a top block is employed, it is preferably situated so that when the float contacts the top block, the magnet in the float is in position to activate the third magnetically operated switch.

Each of the first, second, alternate second and third magnetically operated switches is preferably a magnetic-reed switch. The first switch is preferably normally closed whereas the other mechanically operated switches are preferably normally open.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a side, cross-sectional view of a liquid storage tank employing an embodiment of the apparatus according to the present invention.

FIG. 2 is a schematic circuit diagram showing the wiring of the two relays employed in the present apparatus used in FIG. 1.

FIG. 3 is a side, cross-sectional view of certain components of the present apparatus used in FIG. 1 shown in one position.

FIG. 4 is a side, cross-sectional view of certain components of the present apparatus used in FIG. 1 shown in a second position.

DESCRIPTION OF THE PREFERRED EMBODIMENT

Referring now to the drawings, storage tank 10, equipped with a pump (not shown) to discharge liquid 12 from storage tank 10, as desired has hollow, nonmagnetic tube 14 located inside. Tube 14 is secured and held in a substantially vertical position inside tank 10 by means of support 16 which is itself attached to the inner wall of tank 10.

Top collar 18 and bottom collar 20 are both firmly secured to tube 14. Float 22 is slidably moveable on tube 14 between top collar 18 and bottom collar 20 in response to the level of liquid 12 in tank 10. If the level of liquid 12 is higher than top collar 18, float 22 will remain in contact with top collar 18. Conversely, if the level of liquid 12 is not sufficiently above bottom collar 20 to support float 22 above bottom collar 20, or is below bottom collar 20, float 22 will rest on bottom collar 20.

Float 22 sits low in the liquid 12 to give good stability in wave action and to be self-cleaning. Inside float 22 mounted in opposing holes 24 and 26 are two bar magnets 28 and 30 with like poles in the same direction. Holes 24 and 26 are sealed from the liquid 12 by plugs 32 and 34 which fit snugly into holes 24 and 26, respectively.

Inside tube 14 are normally closed magnetic-reed switch 36, and normally open magnetic-reed switches 38, 40 and 42. Each of the switches 36, 38, 40 and 42 is connected by line 44 (or extension thereof) to electric power source 46. The magnetic force created by bar magnets 28 and 30 is sufficient to activate, i.e., open switch 36 and close switches 38, 40 and 42, when float 22 is located in proximity to these individual switches. Switches 38 and 40 are connected in parallel. Therefore, only three lines 48, 52 and 54 are connected to the output sides of the four switches 36, 38, 40 and 42, i.e., line 48 from switch 36, line 50 from switch 42 and line 52 from the parallel combination of switches 38 and 40.

FIG. 2 illustrates how the wires or lines 48, 50 and 53 are connected to double pole, double throw coil relay A (CRA) 53 and B (CRB) 54. Line 50, from switch 42 is connected to pin 7 of CRA 53. When switch 42 is closed, power from power source 46 cause a current to flow from pin 7 through coil 56 to pin 2 of CRA 53 to ground. This current causes coil 56 to pull contacts 58 and 60 to points 3 and 6, respectively, of CRA 53. Points 3 and 6 of CRA 53 are connected by line 62, and extensions thereof, to electric power source 64, and, with contacts 58 and 60 pulled to pins 6 and 3 of CRA 53, to pins 8 and 1 of CRA 53 by lines 66 and 68, respectively. Pins 8 and 1 of CRA 53 provide power from electric power source 64 through lines 70 and 72, respectively, to two independent sensible alarm signals (not shown).

CRB 54 is wired as follows: When either switch 38 or switch 40 becomes closed, power from source 46 is given through line 53 to pin 2 of CRB 54. Current is thus caused to flow from pin 2 through coil 74 to pin 7 of CRB 54 to ground. This current causes coil 74 to close contacts 76 and 78 between pins 1 and 3, and pins 8 and 6, respectively of CRB 54. Pins 1 and 3 of CRB 54 are connected when contact 76 is pulled to pin 3 by line 81. Pins 2 and 3 of CRB 54 are connected through line 80. Power from source 46 through switch 36 and line 48 to pin 1 of CRB 54 will hold the circuit closed until switch 36 is open by the magnetic force of bar magnets 28 and 30 in float 22. When contact 78 is pulled to pin 6 of CRB 54, pins 6 and 8 are connected by line 82. Power from source 64 is given to pin 8 of CRB 54 through line 62. Power from pin 8 is given to pin 6 through line 82 and from pin 6 to the discharge pump (not shown) through line 84.

Structure 86, is mounted on top of tube 14, and single insulated conduit 88 acts to safely transport electrical connections involved in the present apparatus.

The apparatus illustrated in the drawings functions as follows: Referring now to FIG. 3, the level of liquid 12 in tank 10 is such that float 22 rests on bottom collar 20. In this configuration switch 36 is open under the influence of bar magnets 28 and 30, both CRA 53 and CRB 54 are inactive and the discharge pump is not operating.

The liquid level in tank 10 is allowed to rise so that float 22 moves up tube 14 a sufficient distance so that bar magnets 28 and 30 lose influence over switch 36 and switch returns to its normally closed position.

As the level of liquid continues to rise, float 22 will approach the location of switch 38. Under normal circumstances, switch 38 would close under the influence of bar magnets 28 and 30, thereby activating CRB 54 and the discharge pump so that the level of liquid would drop. The discharge pump would continue in operation until switch 36 is opened under the influence of bar magnets 28 and 30.

For the sake of illustration, unusual circumstances, e.g., electrical power failure, is assumed so that the level of liquid 12 continues to rise and float 22 moves past switch 38 without switch 38 being closed. As float 22 approaches and contacts top collar 18, both switches 40 and 42 are closed thereby activating both CRA 53 and CRB 54. Note that float 22 can not rise beyond top collar 18 no matter how high the level of liquid 12 may be.

CRA 53 will act to cause two sensible alarm signals to be given (as described previously) to indicate that the level of liquid 12 exceeds a predetermined minimum. These alarms will continue to be signalled until the float 22 moves down away from switch 42 so that bar magnets 28 and 30 no longer influence switch 42 into a closed position and switch 42 can return to its normally open position, CRA 53 is deactivated and the alarm signals are stopped.

CRB 54 will act to activate discharge pump causing the level of liquid 12 to drop. As this level drops, float 22 will move down away from switch 40, thereby allowing switch 40 to return to its normally open mode. The discharge pump will continue to operate until the float moves into proximity to switch 36 at which point switch 36 is opened under the influence of bar magnets 28 and 30. With switch 36 open, both CRA 53 and CRB 54 are inactive. The cycle of varying levels of liquid 12 has returned to its starting point.

While this invention has been described with respect to various specific examples and embodiments, it is to be understood that the invention is not limited thereto and that it can be variously practiced within the scope of the following claims.

I claim:

1. An apparatus for monitoring and controlling the level of liquid in a storage tank equipped with a pump to discharge liquid from said storage tank as desired, said apparatus comprising; a tubular guide extending substantially vertically inside said storage tank; a first magnetically operated switch located in said tubular guide; a second magnetically operated switch located in said tubular guide a distance above said first magnetically operated switch; a first electrical current source acting to cause current to pass through said first and second switches when said first and second switches are individually in the closed position and form part of an electrical circuit; a float slidable on the exterior of said tubular guide in response to the level of liquid in said storage tank; magnet means carried by said float and having sufficient magnetic force to activate said first switch and second switch as said float slides on said tubular guide to a location in proximity to said first and second switches, respectively; a second electrical current source to provide current to activate said pump in response to the position of said first and second magnetically operated switches; first relay means acting to allow current from said second source to start flowing to activate said pump as said magnet means activates said second magnetically operated switch, provided that said current to said pump is interrupted in response to said magnet means, activating said first magnetically operated switch; and an alternate second magnetically operated switch located in said tubular guide a distance above said second magnetically operated switch, said alternate switch being in electrical communication with said first current source so that current passes through said switch when said switch is in the closed position and forms part of an electrical circuit, said second current source providing current in response to the position of said alternate switch and provides said current as said magnet means activates said alternate switch, provided that only one of said second switch and said second alternate switch need be activated to start current flowing to said pump.

2. The apparatus of claim 1 wherein said tubular guide includes a top block means and a bottom block means to confine the movement of said float on said guide, said bottom block means being situated so that when said float contacts said bottom block means said magnet means is positioned to activate said first magnetically operated switch.

3. The apparatus of claim 2 further comprising; a third magnetically operated switch located in said tubular guide a distance above said second magnetically operated valve and being capable of being activated by said magnetic means, said third magnetically operated switch being in electrical communication with said first electrical current source to cause current to pass through said third magnetically operated switch when said third switch is in the closed position and forms part of an electrical circuit; and a second relay means in electrical communication with said third magnetically operated switch to allow current from said second source to provide at least one sensible indication that the level of said liquid in said storage tank is at least at a predetermined level upon said third magnetically operated switch being activated.

4. The apparatus of claim 3 wherein said top block means is situated so that when said float contacts said top block means said magnet means is positioned to activate said third magnetically operated switch.

5. The apparatus of claim 4 wherein said alternate second switch and said third switch are located at substantially the same level in said tubular guide and said top block means is situated so that when said float contacts said top block means said magnet means is positioned to activate said alternate second magnetically operated switch.

6. The apparatus of claim 1 wherein said first, second and alternate second magnetically operated switches each is a magnetic-reed switch.

7. The apparatus of claim 1 further comprising; a third magnetically operated switch located in said tubular guide a distance above said second magnetically operated valve, and being capable of being activated by said magnet means, said third magnetically operated switch being in electrical communication with said first electrical current source to cause current to pass through said third magnetically operated switch when said third switch is in the closed position and forms part of an electrical circuit; and a second relay means in electrical communication with said third magnetically operated switch to allow current from said second source to provide at least one sensible indication that the level of said liquid in said storage tank is at least at a predetermined level upon said third magnetically operated switch being activated.

8. The apparatus of claim 7 wherein said alternate second switch and said third switch are located at substantially the same level in said tubular guide.

* * * * *